Oct. 1, 1935.  W. S. WEBSTER  2,015,828
AIRCRAFT DIRECTION FINDER
Filed Nov. 14, 1932  3 Sheets-Sheet 1
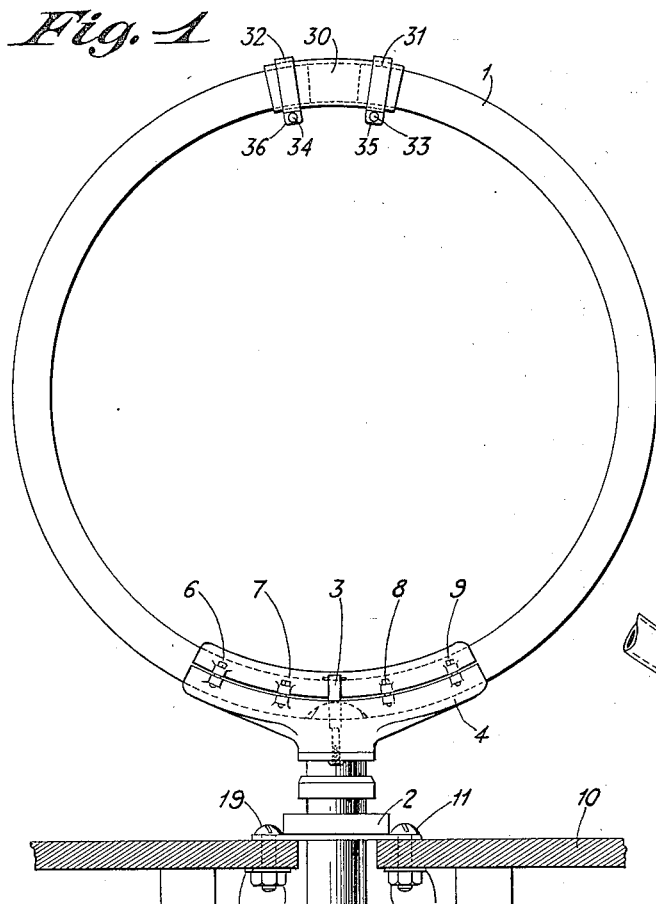
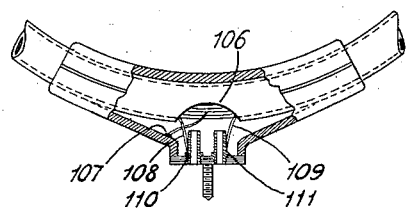
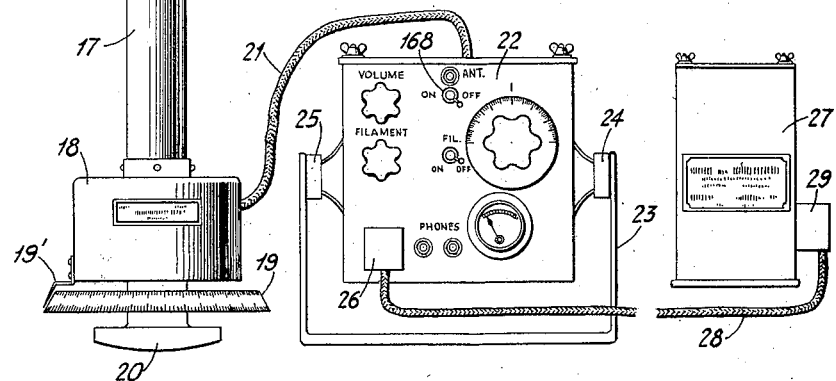
INVENTOR
W. S. WEBSTER
BY H. S. Grover
ATTORNEY Oct. 1, 1935.  W. S. WEBSTER  2,015,828
AIRCRAFT DIRECTION FINDER
Filed Nov. 14, 1932  3 Sheets-Sheet 2
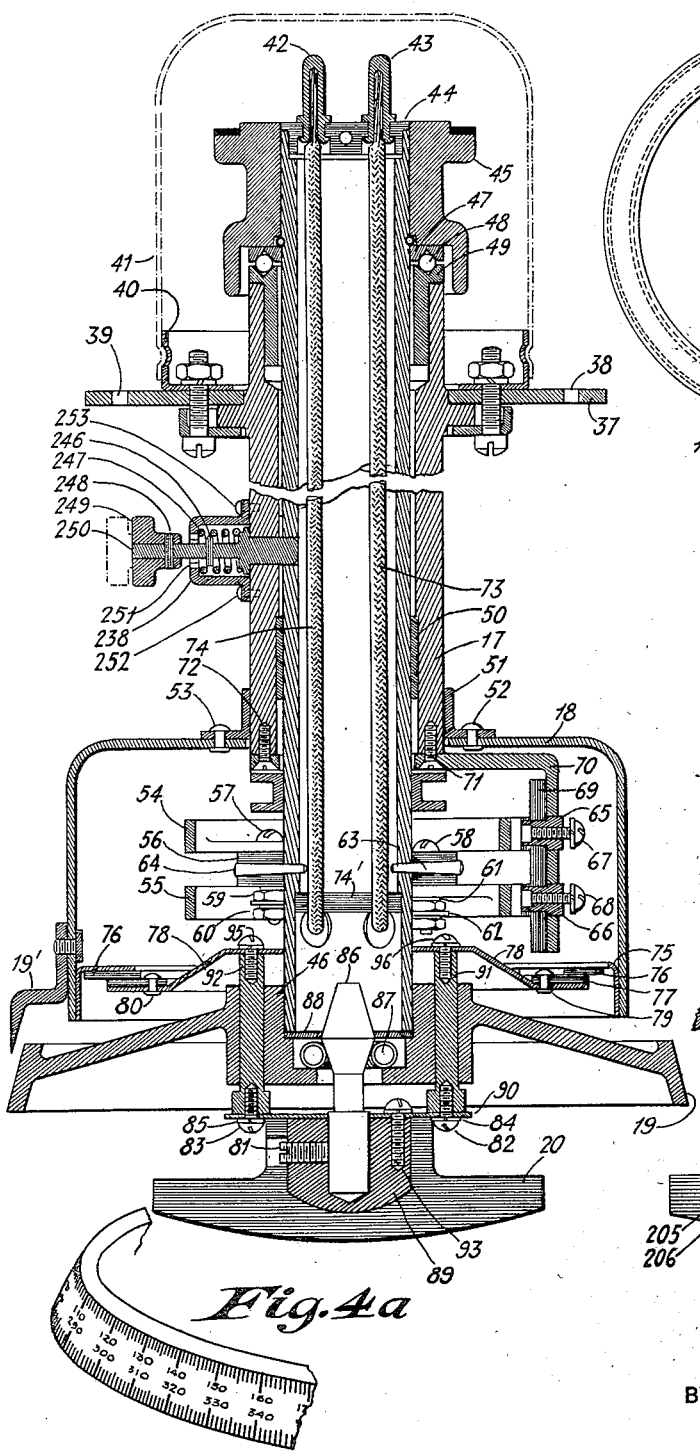
Fig. 4
Fig. 4a
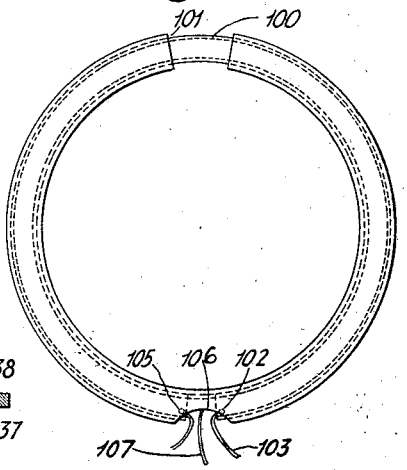
Fig. 5
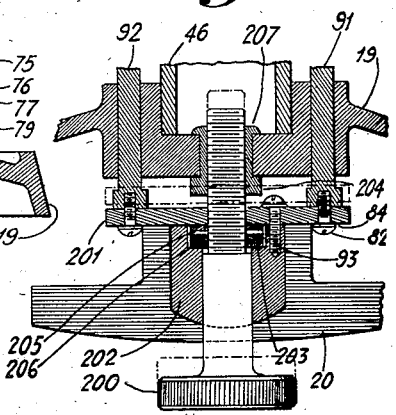
Fig. 6
INVENTOR
W. S. WEBSTER
BY
ATTORNEY Oct. 1, 1935.  W. S. WEBSTER  2,015,828
AIRCRAFT DIRECTION FINDER
Filed Nov. 14, 1932  3 Sheets—Sheet 3

INVENTOR
W. S. WEBSTER
BY
ATTORNEY

Patented Oct. 1, 1935

2,015,828

UNITED STATES PATENT OFFICE 2,015,828

AIRCRAFT DIRECTION FINDER

William S. Webster, Palmyra, N. J., assignor to Radio Corporation of America, a corporation of Delaware Application November 14, 1932, Serial No. 642,528

8 Claims. (Cl. 250—11)

This invention relates to an improved combined radio direction finder system and communication receiver, and more particularly to such a combined system as would be desirable to adapt for aircraft use.

An object of this invention is to simplify and improve a light weight rotatable loop aerial radio direction finder receiver system.

Another object of this invention is the arrangement of the component parts, which is characterized by the ease of installation, small weight and minimum amount of space.

Another object of this invention is to provide a rotatable loop structure and other component parts having the necessary mechanical strength to withstand vibration and shocks which accompany such apparatus when installed on aircraft.

Still another object of this inventon is provision of a novel combined loop rotating handle and friction brake.

A feature of this invention is the shock-proof receiver mounting, which is especially adapted to withstand the vibration occurring with aircraft use.

Another feature of this invention is the shielded detachable conductor cables and plugs for connecting the loop with the radio receiver and the receiver to the battery container.

A direction finder system, according to this invention, comprises a light weight rotatable loop arranged to be quickly detached in order that substitution of loops containing a varied number of turns to cover a different range of radio frequencies, may be readily made. A mounting plate is provided for suitably fastening the loop to the aircraft. Contained within the support mounting are loop down leads which terminate at collector rings, suitable brushes connecting the receiver with the loop by means of shielded detachable conductor cables and plugs. The electrical circuit, which will later be described more in detail, is of the superheterodyne type which has been found very selective and sufficiently sensitive to give a good pick-up with small loops in the order of 12 to 18 inches in diameter.

All parts of this direction finder system have been designed with maximum strength and minimum weight as a paramount requisite, strong aluminum alloys being used as far as possible.

This invention consists of the various features of apparatus and methods as described and illustrated in the accompanying drawings. In the drawings like reference characters refer to like parts throughout the several views, of which, Fig. 1 is an elevation of the loop and its associated operating parts;

Fig. 2 is an elevation of the receiver together with its associated shock-proof mounting;

Fig. 3 is an elevation of the battery container;

Fig. 4 is a vertical cross section of the loop mounting, operating hand wheel and non adjustable friction brake;

Fig. 4a is a detailed perspective of a portion of the improved loop indicating scale;

Fig. 5 is a detail of the loop outer shield and loop winding;

Fig. 6 is a detailed vertical cross section of the operating hand wheel and adjustable friction brake;

Fig. 7 is a section through the terminal portion of the loop, and

Figure 8:
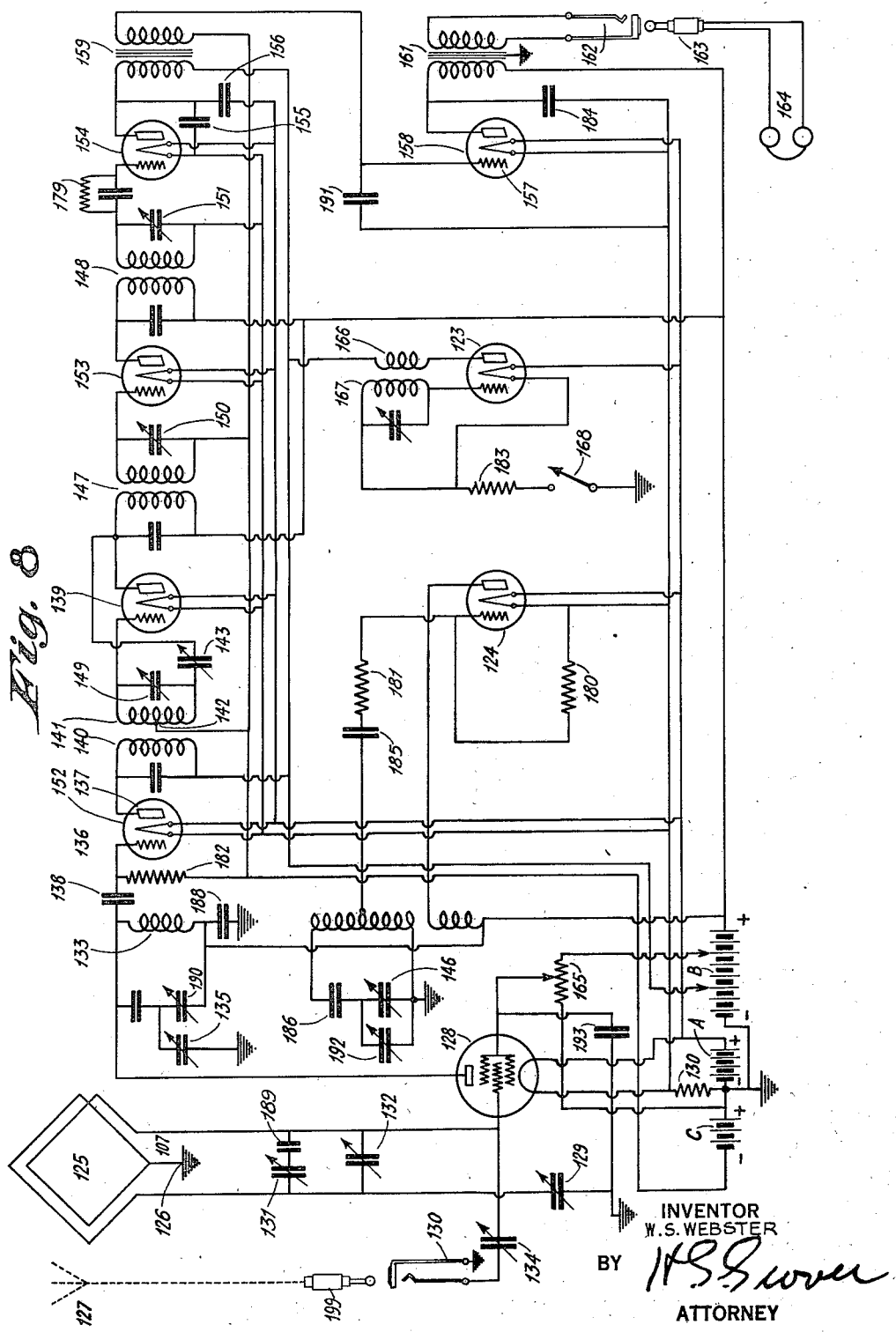
Fig. 8 is a wiring diagram of the electrical circuit.

Referring now to Figs. 1, 2 and 3 of the drawings, the detachable loop 1 is shown fastened to the support housing 2 by means of a pair of thumb screws 3 which are retained within the lower portion of the loop mounting 4. The loop 1 is clamped between the lower loop mounting member 4 and the upper loop mounting member 5 by means of suitable screws or bolts 6, 7, 8 and 9. The support housing 2 is fastened to the fuselage or other suitable portion of the aircraft indicated generally at 10, by screws 11 and 12 which are provided with nuts 13 and 14 and washers 15 and 16. The support housing 2 has a depending portion 17 on which is supported the collector ring housing 18. A scale 19 is graduated with two rows of degree lines from 0 to 360 degrees and two rows of numerals for every 10 degrees, as is shown in detail by Fig. 4a. The upper row of numerals or primary scale is engraved with black degree lines and numerals, and the lower row of numerals or reciprocal scale is engraved with red degree lines and numerals. The upper row starts at 0 and increases to the right. The lower row starts at 0 located directly below 180 of the upper row, and also increases to the right, the purpose of the double scale being to indicate any unbalance in the loop due to capacity. The unbalance in the loop circuit is determined by taking a direction finder reading on the primary scale and then rotating the loop approximately 180 degrees and taking a corresponding reading on the reciprocal scale. The difference between the reading on the primary scale and the reciprocal scale will immediately give the unbalanced or loop error. A suitable index 19' is provided to read the position of the null point. The loop is rotated by the knob 20, and a friction brake is provided to hold the loop in any desired position. Both the knob and the friction brake will be described in more detail later. A shielded detachable cable 21 connects the receiver 22 with the loop 1. The receiver 22 is mounted upon a metallic cradle 23 composed of a light framework of channel-shaped members, the upper portions of which are provided with four resilient blocks 24 and 25 for absorbing any shocks. The two other resilient blocks identical with 24 and 25 are not shown, as they are positioned directly in back of the latter. A shielded detachable cable plug 26 connects the container 27 by means of a shielded detachable cable 28 and plug 29 to receiver 22. These detachable shielded members provide a complete continuity of shielding for the cable conductors from the battery container 27 to receiver 22 through the cables 21 and 28, also the collector ring housing 18 and support 17 to the detachable loop shield 1. The continuity of the shielding is broken only at the top of the loop by separating the ends of the loop shield at this point. The shield is grounded by securely bonding to the metallic frame of the aircraft. To keep moisture from entering the loop winding where the ends of the loop shield are separated, there is provided a flexible insulating tubular cover 30 which is clamped in position by a pair of metallic band clamps 31 and 32 which bind the tube 30 securely to the loop shield by suitable bolts 33 and 34 together with associated nuts 35 and 36.

The loop mounting is shown in detail in Fig. 4. It consists of a metallic disk or base support member 37 with suitable apertures 38 and 39 for mounting the support to the aircraft. At the top portion of the loop support disk 37 a flanged member 40 is located which is arranged to receive a protective cover 41 indicated by the dotted line. This cover 41 protects the loop connection plugs 42 and 43 by means of which the electrical contact is made when the loop is not in its operating position. In order to maintain proper polarity the two plugs are made of different diameters. The loop connection plugs 42 and 43 are mounted upon an insulating member 44 composed of bakelite or any other suitable insulating material. Surrounding the insulating member 44 there is a metallic collar 45 to which is fastened the inner loop tube 46. Within the collar 45 there is provided a ball bearing race 47 containing suitable ball bearings 48 and lower ball bearing race 49 to insure ease of loop rotation. Eccentric motion is prevented by a spacing collar 50. The collector ring housing 18 is fastened to the support 17 by means of a flange 51 and suitable rivets 52 and 53. Within the housing 18 there is provided a pair of collector rings 54 and 55 which are supported to insulating supporting member 56 by means of suitable screws 57 and 58, nuts 59 and 60, and washers 61 and 62. This insulating member is fastened to the inner loop tube 46 by means of pins 63 and 64. Connection is taken from the collector rings by suitable brushes 65 and 66 which are connected to detachable shielded leads by means of screws 67 and 68. These brushes are supported from the member 47 by means of an insulating member 69 and a bracket 70, the bracket is fastened to the member 17 by screws 71 and 72. The collector rings 54 and 55 are connected to the loop plugs 42 and 43 by insulated conductor leads 73 and 74. The leads are retained and spaced within tube 46 by an insulating disk 74'. Within the lower portion of the housing 18 there is provided a flanged member 75 on which is supported a friction disk 76 which serves as the fixed element of the loop brake. The brake rotating element 77 is supported on a metallic disk 78 by means of suitable rivets 79 and 80. The rotatable loop brake disk is fastened to the operating hand wheel 20 by means of a disk member 90 which retains four sliding studs 91, 92, 93 and 94. These sliding studs are secured to the disk 90 by suitable screws 82, 83, 93' and 94' which are provided with lock washers 84, 84', 85 and 85'. The upper portion of the studs are secured to the brake by screws 95 and 96.

The loop brake is released by pulling down the operating hand wheel 20. The brake as shown in Fig. 4, is of the non-adjustable type and is shown in the engaged position. There being no intermediate position of the loop brake it is either engaged or released.

A double tapered stud 86 is fastened by a set screw 81 passing through a metallic insert 89 which is moulded in the operating hand wheel 20.

Cooperating with the stud 86 there is a coiled helically wound spring 87 whose ends are joined together, forming a ring. The spring 87 is retained in proper vertical position by the washer 88 and the hub portion of the scale 19. A downward pull of the hand wheel 20 draws the stud 86 through the spring 87 which spreads the spring and allows it to pass over the large diameter of stud 86, thus separating the friction surfaces 76 and 77 of the loop brake.

The adjustable type friction brake is shown in Fig. 6 which indicates the brake in the released position. This modification is similar to the non-adjustable type shown in Fig. 4 except for the addition and substitution for member 86 an adjustable thumb screw 200 which passes through the operating knob 20 which has a suitable metallic insert bearing 202. The thumb screw 200 is retained within the operating knob 20 by a retaining collar 203 which is secured to member 200 by a pin 205; a spacing washer 206 is also provided. Friction is applied or released on the breaking surfaces 76 and 77 by rotating the thumb screw 200, thus varying the amount of friction between the above mentioned surfaces. The thumb screw 200 is threaded in the member 204 which is securely retained to the hub portion of scale 19 by spinning or properly turning over the upper portion of the metal as indicated at 207. The disk 201 is held securely to the metallic insert 202 of knob 20 by suitable screws 93. When applying friction to the breaking surfaces 76 and 77 the operating knob 20 will be raised or lowered with respect to the scale 19 by the amount that the thumb screw 200 is threaded in the member 204, as indicated by the dot and dash line. Studs 91 and 92 are fastened to member 78 by means of proper screws 95 and 96 as described above, for the non-adjustable type brake.

There is also provided a positive lock 250 which retains the loop in a non-rotating engagement when the direction finder is not in use. The lock proper comprises a spring housing 238 which is fastened to the pedestal support member 17 by screws 252 and 253. An operating knob 249 is fastened to the lock plunger 250 by a pin 248. A spring 247 keeps the lock plunger 250 always in the engaged or locked position. The lock plunger 250 is released or placed in the non-engaged position by compressing the spring 247 and pulling the knob outward as indicated by the dot and dash line through a narrow slot 251 in the housing member 238. After the pin 246 is carried outside of the block housing 238, the knob 250 is rotated approximately 90 degrees from the position indicated by the drawings, and is thus prevented from entering the slot 251.

Referring now to the details of the detachable circular metallic loop as shown in Figs. 5 and 7, a flexible insulating tube 100, of rubber or any other suitable material, is split longitudinally and is inserted in the metallic loop shield 1 at its top 101, and a complete turn is made inside the shield. At one end of the insulated tube 100 there is provided a small aperture 102 through which the flexible insulating conductor 103 is looped around once. The conductor is wound by threading it through the loop and pushing the insulating tubing 100 around the inside of the metallic loop shield 1 only one-half the number of turns required for the loop. For example, on a 12-turn loop the rubber tubing 100 which acts as a winding bobbin for the conductor 103, is given 6 turns. Then a short center terminal lead 107 is soldered at the end of sixth turn and the winding of the loop turns then continues until the total twelve turns are wound. The end of the winding is looped around once through the hole 105. The entire winding which is enclosed within the rubber tubing, is moved around a half turn until the small apertures 102 and 105 containing the loop leads are directly in front of the circular opening 106 of the loop shield 1. The rubber tube cover 30 is then slipped over the opening 101. The two end leads of the loop winding 108 and 109, also the center lead 107, are carried down through the opening. The end leads are soldered to suitable terminals 110 and 111, and the center lead 107 is grounded to the metallic frame 4 of the loop shield. A wide range of frequencies is covered by providing several loops with different number of turns and a corresponding number of separate removable tuning units. The insulating tube 100 in addition to providing a convenient winding means, also gives a low capacity winding, thus keeping down the size of the tuning condenser of the receiver and enabling an ample operating range to be covered, which is a desirable feature to reduce space and weight. Also maintaining a low distributed capacity in the loop winding and with a small tuning capacitor, gives the highest input voltage.

The receiver circuit is of the superheterodyne type, employing a single stage of r—f amplification and two stages of i—f amplification. In addition to the usual r—f oscillator, an i—f oscillator is used to produce a constant pitch beat note in the audio range for receiving pure c. w. signals. As the use of this oscillator is not required for modulated c. w. or telephone signals, it may be conveniently cut out by a switch 168 located on the receiver panel 22.

Referring now to Fig. 8, when the receiver is used for communication purposes, the trailing wire antenna 127 is connected by the removable plug 199 to the jack 130 marked "Antenna" on the receiver panel 22. A small adjustable trimmer capacitor 134 is provided in series with the antenna in order to minimize the detuning of the loop circuit when the trailing wire antenna is in use.

The general arrangement of circuits is as follows: The loop 125 is tuned by the ganged capacitor 131, and fed into the grid of the r—f amplifier tube 128. The balancing condenser 129 insures that the loop capacities to ground will be symmetrical. The center tap 107 of the loop is grounded to the loop shield at 126, and the bias for the r—f tube is obtained by the drop in potential in the resistor 130.

The plate circuit of the r—f tube 128 is tuned by the inductance coil 133 and condensers 135 and 187, and coupled to the grid 136 of the first detector through condenser 138. A biasing resistor 182 is provided for obtaining a negative bias. The plate 137 of the first detector is coupled to the first i—f tube 139 by the transformer 140, the secondary 141 of which is tapped at its center 142 to form a balancing element for the first i—f tube in conjunction with the balancing capacitor 143.

The r—f oscillator comprises the tube 124 and inductance coils 144 and 145, grid condenser 185, and a grid leak resistance 180. The circuit is tuned by the third section of the ganged condensers 146, and is coupled inductively to the first detector grid coil 133. A small adjusting condenser 186 is provided to alter the tuning characteristic of the oscillator circuit. A series grid resistor 181 is provided for the purpose of minimizing the variation in the oscillator output voltage between the high and low frequency ends of the frequency band covered by the receiver.

All of the intermediate frequency transformers, 140, 147 and 148, are tuned to 40 kc. by the adjustable trimmer capacitors 149, 150 and 151 respectively.

The two i—f amplifier tubes 139 and 153, are coupled through the three transformers 140, 147 and 148, and feed into the second detector tube 154, which uses grid detection as indicated by the grid leak and condenser 179. The r—f component of the output from this tube 154 is by-passed to both sides of the filament by condensers 155 and 156. The a—f component is coupled to the grid 157 of the audio amplifier tube 158 by the transformer 159.

The audio amplifier tube is externally biased directly from the "C" battery 160. The audio output is fed through the electrostatically shielded output transformer 161, into the telephone jack 162; a plug 163 connects to the phones 164. The plate by-pass condenser is indicated at 184 and the grid by-pass condenser is shown as 191. The electrostatically shielded output transformer 161 is arranged to prevent any capacity transfer of energy from the phones and the operator by providing a suitable metallic shield preferably of copper, between the primary and secondary winding, the copper shield being grounded to the ground of the receiver circuit.

The volume control is an adjustable resistor 165 which controls the voltage on the screen of the r—f amplifier tube.

The i—f oscillator tube 123 connected to the coils 166—167, is employed for c. w. reception. The control of this oscillator is by a switch 168 which opens or closes the filament circuit of the tube. The resistance 183 serves to drop the filament voltage from 4 volts to 2 volts as required by the tube employed.

The battery box 27 contains a storage battery 169, a "C" battery 160, and "B" battery 170. A terminal member is mounted on the battery box for receiving the plug 29 on the battery cable.

The battery box is to be placed as near the receiver as is practical, to keep the shielded battery cable short, thereby avoiding excess pickup of signal.

A conduit type shielded cable 28 connects the battery box 27 and the receiver 22. A plug 26 is used at the receiver end of the cable.

Although this invention has been described as embodied in a particular form and arrangement of parts, it should be understood that it is capable of embodiment in other and different forms within the spirit and scope of the appended claims.

I claim:

1. A radio direction finder system comprising a detachable rotatable loop mounted on a disk-like support, positive locking means comprising a spring housing, a plunger, and a spring within said housing for retaining said detachable loop to said support, a rotating tube within said support, a primary and reciprocal scale secured to said rotating tube, a housing associated with said support, a pair of collector rings, and a pair of brushes within said housing with shielded means for electrically connecting the loop with a radio receiver.

2. An aircraft direction finder comprising a detachable loop aerial, a support plate for retaining the direction finder to the aircraft, a depending tubular portion secured to said support plate, a tubular rotating member for rotating the loop within said depending portion, a pair of collector rings insulatingly secured to said rotating member and leads connecting the collector rings with the aerial, a housing enclosing said collector rings, an index fastened to the outside of said housing, a fixed flat friction surface secured within said housing, a scale and an operating knob retained at the end of said rotating member, a rotating flat friction surface secured to said scale, and means within said scale whereby the said fixed and rotating friction surfaces become engaged to prevent rotation of the loop by the manipulation of said operating knob.

3. An aircraft direction finder comprising a detachable loop aerial, a support plate for retaining the direction finder to the aircraft, a depending portion secured to said support plate, a rotating member for rotating the loop located within said depending portion, means for connecting said aerial with a receiver, a housing enclosing said connecting means, an index fastened to said housing, a flat friction surface secured within said housing, a scale and operating knob retained at the end of said rotating member, a rotating flat friction surface secured to said scale, a double tapered stud and a spring located within said scale, the end of said stud being secured to said operating knob whereby the said fixed and rotating friction surfaces become engaged to prevent rotation of the loop by the manipulation of said operating knob.

4. An aircraft direction finder comprising a detachable loop aerial, a support plate for retaining the direction finder to the aircraft, a depending portion secured to said support plate, a rotating member for rotating the loop located within said depending portion, means for connecting said aerial with a receiver, a housing enclosing said connecting means, an index fastened to said housing, a flat friction surface secured within said housing, a scale and operating knob retained at the end of said rotating member, a rotating flat friction surface secured to said scale, a threaded bushing and a threaded stud located within said scale, the threaded stud being secured within the operating knob, and means outside of said operating knob for turning said threaded stud whereby the said fixed and rotating friction surfaces become engaged to prevent rotation of the loop by the manipulation of said threaded stud.

5. A direction finder system for use on a mobile unit, comprising a detachable loop aerial, a support means for retaining the direction finder to said mobile unit, a depending portion secured to said support means, a rotating member for rotating the loop within said depending portion, a pair of collector rings insulatingly secured to said rotating member and leads connecting said collector rings with said loop aerial, a housing enclosing said collector rings, an index fastened to the outside of said housing, a fixed friction surface secured within said housing, a scale and an operating knob retained at the end of said rotating member, a rotating friction surface secured to said scale and means within said scale whereby the fixed and rotating friction surfaces become engaged to prevent rotation of the loop by the manipulation of said operating knob.

6. A direction finder system for use on a mobile unit, comprising a detachable loop aerial, a support means for retaining the direction finder to said mobile unit, a depending portion secured to said support means, a rotating member for rotating the loop within said depending portion, a pair of collector rings insulatingly secured to said rotating member and leads connecting said collector rings with said loop aerial, a housing enclosing said collector rings, an index fastened to the outside of said housing, a fixed friction surface secured within said housing, a primary and a reciprocal scale and an operating knob retained at the end of said rotating member, a rotating friction surface secured to said scale and means within said scale whereby the fixed and rotating friction surfaces become engaged to prevent rotation of the loop by the manipulation of said operating knob.

7. A direction finder system for use on a mobile unit, comprising a detachable loop aerial, a support means for retaining the direction finder to said mobile unit, a depending portion secured to said support means, a rotating member for rotating the loop within said depending portion, positive locking means for retaining said detachable loop to said support means, a pair of collector rings insulatingly secured to said rotating member and leads connecting said collector rings with said loop aerial, a housing enclosing said collector rings, an index fastened to the outside of said housing, a fixed friction surface secured within said housing, a scale and an operating knob retained at the end of said rotating member, a rotating friction surface secured to said scale and means within said scale whereby the fixed and rotating friction surfaces become engaged to prevent rotation of the loop by the manipulation of said operating knob.

8. A direction finder system for use on a mobile unit, comprising a detachable loop aerial, a support means for retaining the direction finder to said mobile unit, a depending portion secured to said support means, a rotating member for rotating the loop within said depending portion, a pair of collector rings insulatingly secured to said rotating member and leads connecting said collector rings with said loop aerial, a housing enclosing said collector rings, an index fastened to the outside of said housing, a fixed friction surface secured within said housing, a ring-like scale arranged to rotate with said loop, said scale having upper and lower graduations to indicate degrees and suitable numerals for said indications, said numerals being arranged 180° in opposition to each other for indicating the unbalanced loop error, and an operating knob retained at the end of said rotating member, a rotating friction surface secured to said scale, and means within said scale whereby the fixed and rotating friction surfaces become engaged to prevent rotation of the loop by the manipulation of said operating knob.

WILLIAM S. WEBSTER.